United States Patent [19]
Kobayashi et al.

[11] Patent Number: 5,462,156
[45] Date of Patent: Oct. 31, 1995

[54] CONVEYER DEVICE AND CONNECTION STRUCTURE OF ROLLERS INCORPORATING MOTORS

[75] Inventors: Kazuaki Kobayashi; Kazuo Kobayashi, both of Hyogo, Japan

[73] Assignee: Itoh Electric Company Limited, Hyogo, Japan

[21] Appl. No.: 301,803

[22] Filed: Sep. 7, 1994

[30] Foreign Application Priority Data

Nov. 30, 1993 [JP] Japan .................... 5-068939 U

[51] Int. Cl.⁶ .................................................. B65G 13/06
[52] U.S. Cl. .................................. 198/788; 198/780
[58] Field of Search ................................. 198/780, 783, 198/785, 788

[56] References Cited

U.S. PATENT DOCUMENTS 1,725,740  8/1929  Schulte ............................ 198/788
1,733,379  10/1929  Lowy ............................... 198/785
1,780,493  11/1930  McKee ............................. 198/788

*Primary Examiner*—James R. Bidwell
*Attorney, Agent, or Firm*—Wood, Phillips, VanSanten, Clark & Mortimer

[57] ABSTRACT

Disclosed is a conveyer device using a plurality of motor-incorporated rollers. The conveyer device related to the invention provides advantageous structure in that motor-incorporated rollers are highly interchangeable and practically usable with very high supply voltages. Each pair of the motor-incorporated rollers for composing the conveyer device are connected in series to each other. Each motor built in the motor-incorporated roller is based on star connection as per 200 VAC of rated voltage. Interphase impedance of each motor built in the roller is 700 Ω against supply power. The conveyer device itself uses 400 VAC of power source.

10 Claims, 4 Drawing Sheets

CONVEYER DEVICE AND CONNECTION STRUCTURE OF ROLLERS INCORPORATING MOTORS

BACKGROUND OF THE INVENTION

1. Field of the Invention

The present invention relates to a conveyer device, more particularly, to a conveyer device using a plurality of rollers each incorporating a motor as drive source. In addition, the invention also relates to structure of the connection of rollers each incorporating a drive motor.

2. Description of the Related Art

Pulleys of any conventional belt-conveyer unit and rollers of any conventional roller-conveyer unit are respectively driven by a plurality of motors secured to frames. However, in response to industrial demand for easier assembly work and minimizing cubic space occupied by conveyer installations, recently, a greater number of drive pulleys and drive rollers each incorporating a motor have been introduced.

The term "roller incorporating a motor" designates such a roller internally being equipped with a drive motor which rotatably drives the roller itself such as the one typically disclosed in the Japanese Laid-Open Patent Application Publication No. SHO63-235207 (1988) and the Japanese Laid-Open Patent Application Publication No. HEI4-243720 (1992) for example.

Taking a conventional roller conveyer for example, a plurality of rollers each incorporating a motor are secured to frames as basic structure of such a conventional conveyer unit using plural rollers incorporating motors.

Those motor-incorporated rollers used for any conventional roller conveyer by way of being secured to frames respectively incorporate motors each having rated voltage exactly matching supply voltage conventionally being available.

Those motor-incorporated rollers used for such a conventional roller conveyer respectively incorporate a motor having connection to the power source in parallel.

In terms of supply voltage, normally, 200VAC is commercially available for three-phase alternating current in Japan. Nevertheless, in some cases, 400VAC is also introduced as factory powersource. On the other hand, not only 400VAC, but, in many cases, more than 400VAC of supply voltages are also conventionally used in the U.S.A. and European countries. In other words, there are a wide variety of motor-incorporated rollers using a variety of rated voltages in the world. In consequence, in spite of identical diameter and length, many of those conventional motor-incorporated rollers are devoid of interchangeability.

As a result, users and dealers of conveyer units are obliged to constantly hold a wide variety of motor-incorporated rollers to prepare for repairing those conveyer units.

Furthermore, such a conventional conveyer unit using motor-incorporated rollers has critical problem in that difficulty involves in the use of high-voltage power source.

This is because those rollers incorporating motors are generally inappropriate to use high-voltage power source. In other words, in order to gain impedance compatible with actual voltage while rotating a built-in motor with high voltage, it is imperative that the number of the winding of coils be increased.

However, since each motor is built in a roller body, there is a certain limit on the external diameter of each coil, and thus, the number of the winding of each coil cannot be increased indefinitely.

Although there is an idea to contract wire diameter of each coil in order to solely increase the number of winding of each coil while maintaining external diameter of each coil constant, this in turn significantly lowers mechanical strength of each coil to result in occurrence of potential problem such as disconnection and faulty insulation.

SUMMARY OF THE INVENTION

The object of the invention is to provide an improved conveyer device which is capable of properly executing operation with high-voltage power supply source and accommodating parts with high interchangeability.

To achieve the above object, the invention provides an improved conveyer device provided with a plurality of rollers each incorporating a motor. Characteristically, at least two of the motor-incorporated rollers are so arranged that the built-in motors are connected to each other in series.

According to the improved conveyer device of the invention, since motors of respective motor-incorporated rollers are connected to each other in series, supply voltage is divided by respective motors, thus lowering voltage being delivered to individual motors.

Owing to this arrangement, the improved conveyer device of the invention can securely deal with high supply voltage via a plurality of motor-incorporated rollers each having low rated voltage. According to the invention, an improved conveyer using a variety of supply voltages can be composed by means of a plurality of motor-incorporated rollers bearing a few kinds of rated voltages, thus significantly improving interchangeability of motor-incorporated rollers.

In consequence, the invention has made it possible to compose an improved conveyer device capable of properly accommodating high-voltage power source by provision of a plurality of motor-incorporated rollers using motors respectively having conventional wire diameter and normal number of winding of coils, and to avoid the problem such as disconnection and faulty insulation.

The above and further objects and features of the invention will more fully be apparent from the following detailed description and the accompanying drawings.

DESCRIPTION OF THE PREFERRED EMBODIMENTS

Figure 2:
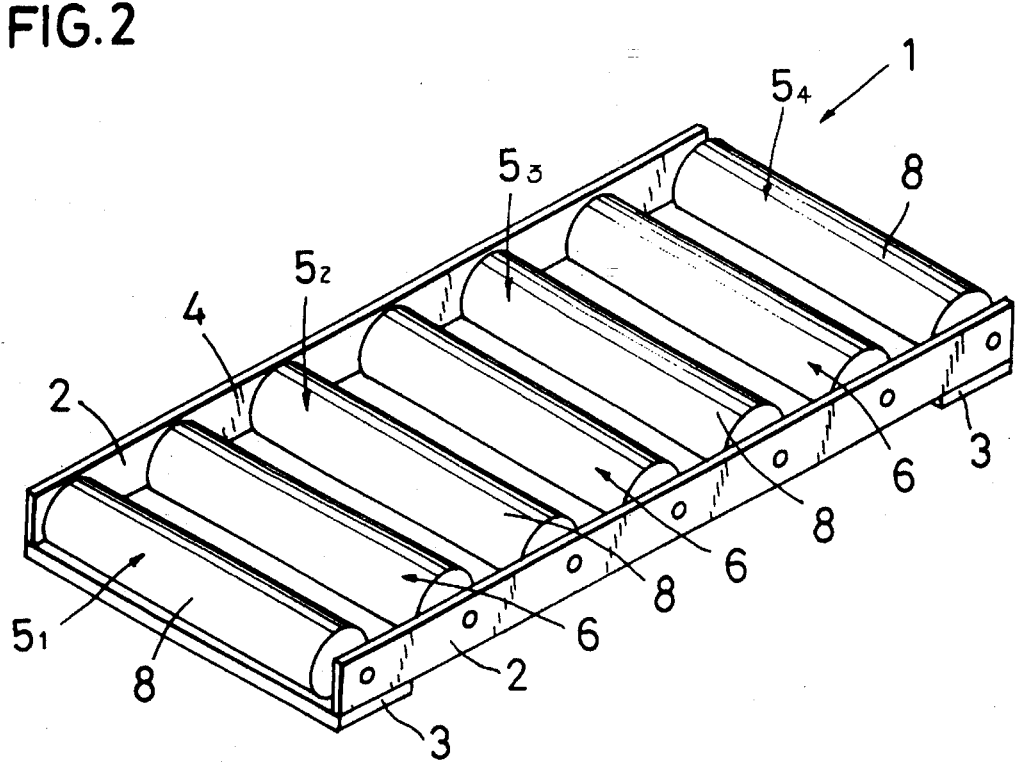
FIG. 2 is a perspective view of the conveyer device according to a concrete embodiment of the invention.

The reference numeral 1 shown in FIG. 2 designates a conveyer device according to a concrete embodiment of the invention. The conveyer device 1 according to this embodiment comprises the following; a pair of side plates 2 disposed in parallel, a frame composed of a pair of bottom plates 3, four units of rollers $5_{-1}$, $5_{-2}$, $5_{-3}$, $5_{-4}$, each incorporating a motor, and three units of follower rollers 6, wherein the four drive rollers 5 and the three follower rollers 6 are alternately secured to the frame 4.

Figure 3:
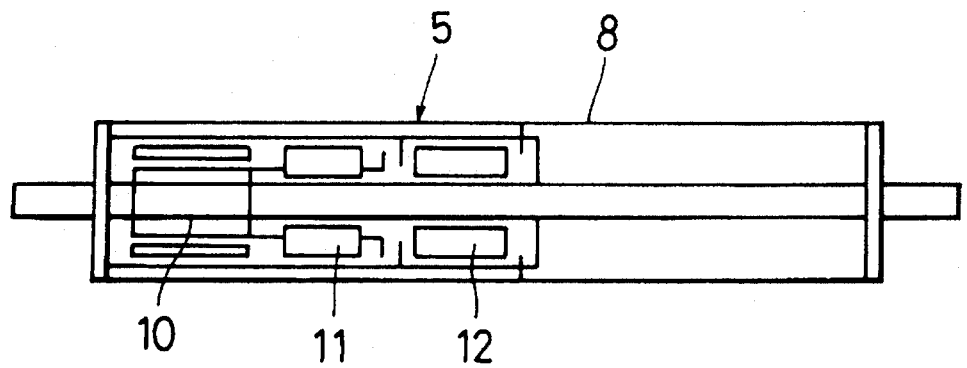
FIG. 3 is a simplified block diagram of a roller incorporating a motor provided for the conveyer device shown in FIG. 2.

Each of the four drive rollers 5 used for embodying the invention incorporates a motor 10, a reduction gear 11, and a clutch 12 like a conventional roller unit shown in FIG. 3. When the motor 10 rotates, the rotating force is decelerated to a predetermined number of rotation by the reduction gear 11 to cause a roller body 8 to be rotated via the clutch 12.

Figure 4:
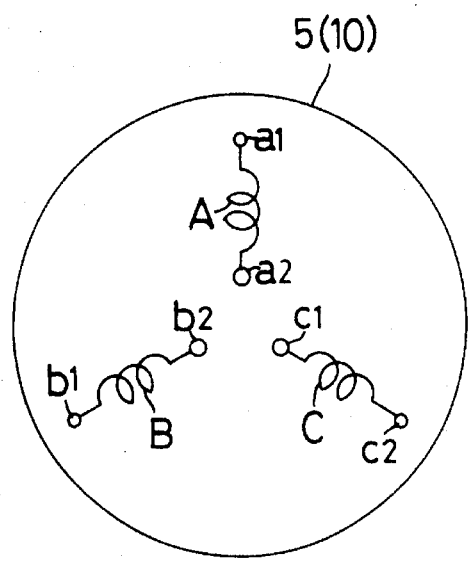
FIG. 4 and FIG. 5 are respectively simplified block diagrams of circuits of a roller incorporating a motor introduced to the conveyer device according to an embodiment of the invention.

Each of the motor-incorporated drive rollers 5 available for embodying the invention incorporates a motor 10 accommodating 50/60Hz and 200VAC of rated voltage and comprising three-phase AC star-connection. As shown in FIG. 4, three coils A, B, and C, are wound on a stator, where both ends $a_1$, $a_2$, $b_1$, $b_2$, $c_1$ and $c_2$, of the coils A, B. and C, are respectively drawn out of the motor-incorporated roller 5 by means of corresponding lead wires.

Figure 5:
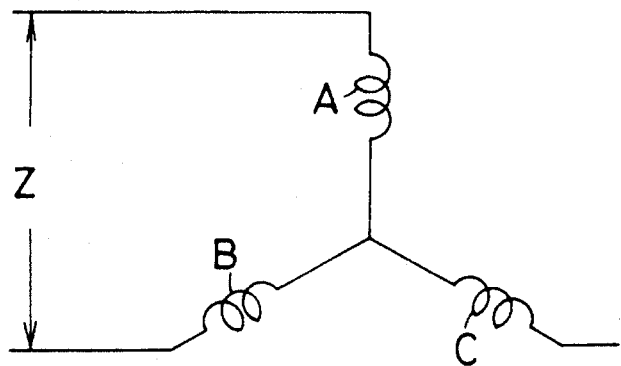

As shown in FIG. 5, when the coils A,B, and C are linked by star-connection, there is about 700Ω of interphase resistance value. Therefore, there is at least more than 700 Ω of interphase impedance Z against 50/60Hz three-phase alternating current being used for supply power of the motor-incorporated roller 5.

Figure 1:
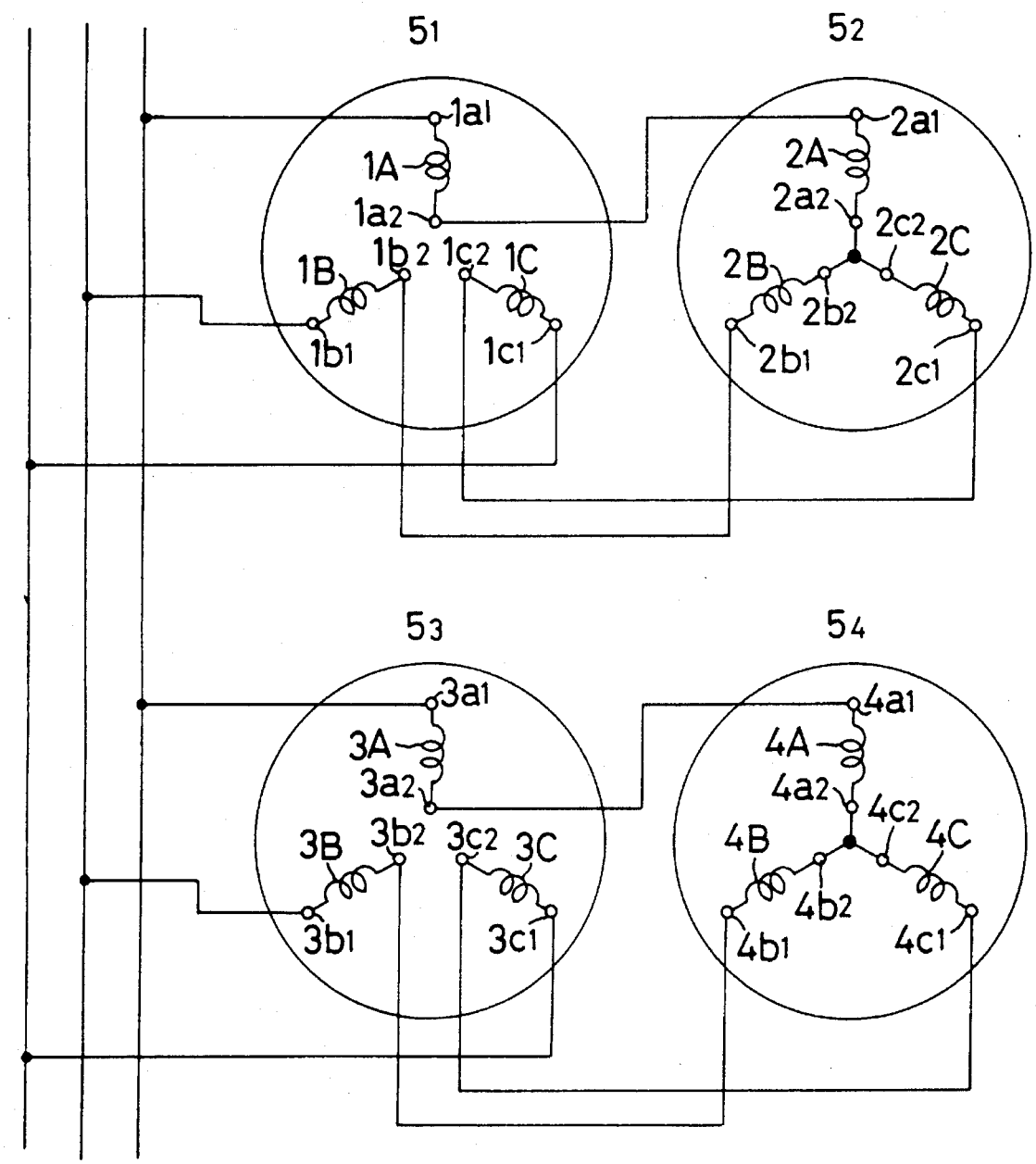
FIG. 1 is a detailed block diagram of circuits provided for the conveyer device according to a concrete embodiment of the invention.

Referring now to FIG. 1, connection of respective motors 10 provided for the conveyer device 1 is described below. In the conveyer device 1 of the present embodiment of the invention, a pair of motors 10, in other words, the motor-incorporated rollers $5_{-1}/5_{-2}$ and $5_{-3}/5_{-4}$, are connected to each other in series. These pairs of motor-incorporated rollers set in series are respectively connected in parallel to power sources having 50/60Hz 400VAC of rated voltage.

More particularly, an end $1a_1$ of a coil 1A of the motor-incorporated roller $5_{-1}$ is connected to the power source, whereas the other end $1a_2$ is connected to an end $2a_1$ of a coil 2A of the motor-incorporated roller $5_{-2}$.

In the same way, an end $1b_1$ of a coil 1B is connected to the power source, whereas the other end $1b_2$ is connected to an end $2b_1$ of a coil 2B of the motor-incorporated roller $5_{-2}$. Likewise, an end $1c_1$ of a coil 1C is connected to the power source, whereas the other end $1c_2$ is connected to an end $2c_1$ of a coil 2C of the motor-incorporated roller $5_{-2}$.

The other ends $2a_2$, $2b_2$, and $2c_2$ of the coils 2A, 2B, and 2C of the motor-incorporated roller $5_{-2}$ are connected to each other by way of star-connection. The same applies to the motor-incorporated rollers $5_{-3}$ and $5_{-4}$.

When power is transmitted to the conveyer device 1 related to the invention, since the coils A, B, and C are connected in series to the coils A, B, and C of adjoining motor-incorporated rollers, each motor receives one half voltage of the supply voltage (400VAC). In other words, each motor 10 shares 200VAC of the rated voltage, thus permitting respective motors to normally rotate themselves.

More particularly, when connecting all the motor-incorporated rollers in parallel with each other (under normal condition of use), each coil of a star-connection motor receives such a voltage expressed by ⌈supply voltage×1/1.733⌋. In other words, such a motor bearing 200VAC of rated voltage is so designed that it can normally rotate itself whenever each coil receives such a voltage expressed by ⌈200VAC ×1/1.73⌋.

The conveyer device 1 according to the invention is connected to a 400VAC power source. However, since respective coils A, B, and C are connected in series to those corresponding coils A, B, and C of adjoining motor-incorporated rollers, those coils A, B, and C respectively receive a voltage expressed by ⌈400VAC ×1/1.73 ×½⌋. In consequence, each coil eventually receives such a voltage exactly identical to the rated voltage. This in turn permits all the built-in motors to normally rotate themselves.

When operating such a conventional conveyer device cited earlier, since motor-incorporated motors are connected in series, in the event that load of either side of the motor-incorporated rollers ever varies or for any reason if they were locked, impedance on the part of the locked rollers is lowered to cause voltage between terminals on the locked side to also lower, thus causing voltage applicable to those rollers of the other side to unavoidably increase.

On the other hand, when operating the motor-incorporated rollers used for embodying the invention, since interphase impedance of respective motors is constantly high, in other words, since inter- phase impedance proper to the stator remains high, even though the motor-incorporated rollers of either side were locked, variable rate of absolute value of impedance of the locked motor-incorporated rollers remains negligible.

Concretely, for any reason, even when overload is applied to one of those motor-incorporated rollers 5 and then the overloaded roller is locked, in the conveyer device related to the invention, voltage applicable to interphase of the locked motor merely lowers by about 10% from the normally applicable voltage. More particularly, each motor 10 specifically introduced to embody the invention contains such a stator incorporating those coils each having more than 700Ω of interphase impedance Z. Actually, this impedance value is much higher than that of conventionally available motors. Because of this, when any of those motors 10 is locked, despite of slight decline of impedance incurred, rate of lowering absolute value of impedance remains negligible.

In consequence, voltage applied to the locked motor slightly lowers, and conversely, voltage applied to the rest of motors (connected in series to each other without being locked) merely makes minimal rise.

Report on Experiments

Based on the above-referred condition, inventors experimentally locked one of a pair of motor-incorporated rollers. As a result, the other motor-incorporated roller satisfied E-class rating (120° C.) in the rise of temperature despite of slightly heated effect.

After experimentally fabricating several kinds of motor-incorporated rollers, inventors tested these rollers. It was consequently confirmed that motors could be prevented from being burnt when more than 400 Ω of interphase impedance was secured.

It is therefore very evident that insofar as more than of interphase impedance value is present, even when load of one of a pair of motor-incorporated rollers fluctuates or being locked, voltage applied to the other roller insignificantly varies. Even when one of a pair of motor-incorporated rollers halts rotation, the other roller continuously rotate itself, thus preventing both rollers from incurring unwanted burn.

According to the inventive conveyer device 1 thus far described, four of the motor-incorporated rollers 5 ($5_{-1}$, $5_{-2}$, $5_{-3}$, and $5_{-4}$) are divided into two groups, and yet, the adjoining motor-incorporated rollers are connected in series to each other. Since load applicable to adjoining motor-incorporated rollers generally approximates to each other, equal voltage is applied to respective motors when adjoining motor-incorporated rollers are connected in series to each other, thus achieving desirable effect. It should be understood however that the scope of the invention is not solely defined in the structure exemplified in the above embodiment, but the invention can also alternately provide the motor-incorporated rollers and connect the motor-incorporated rollers of both ends in series. In addition, it is also possible for the invention to connect a plurality of motor incorporated rollers in series for composing a series of conveyer lines on different frames.

Figure 6:
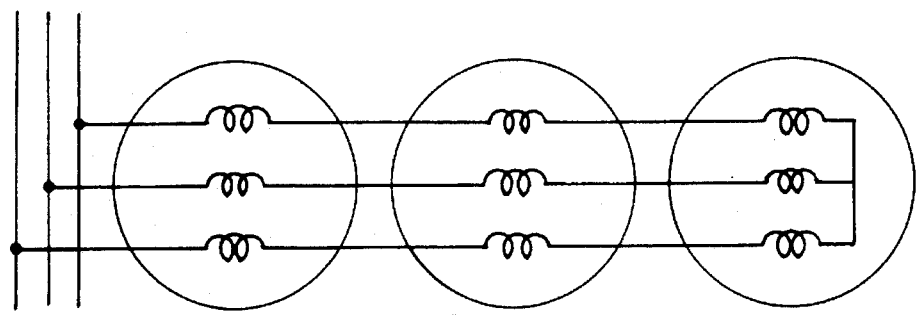
FIG. 6 and FIG. 7 are respectively schematic block diagrams of circuits of the conveyer device according to a variation of an embodiment of the invention.

The above embodiment of the inventive conveyer device has exemplified a structure in which a pair of the motor-incorporated rollers are connected in series to each other. However, as shown in FIG. 6, in accordance with supply voltage and rating of motor, the invention also permits connection of three motor-incorporated rollers in series. More than three of the motor-incorporated rollers may also be connected in series to each other. When connecting a number of motors built in the motor-incorporated rollers in series, it is desired that rated voltage of these motors exactly matches the resultant value from a division (supply voltage divided by the number of motors connected in series).

Figure 7:
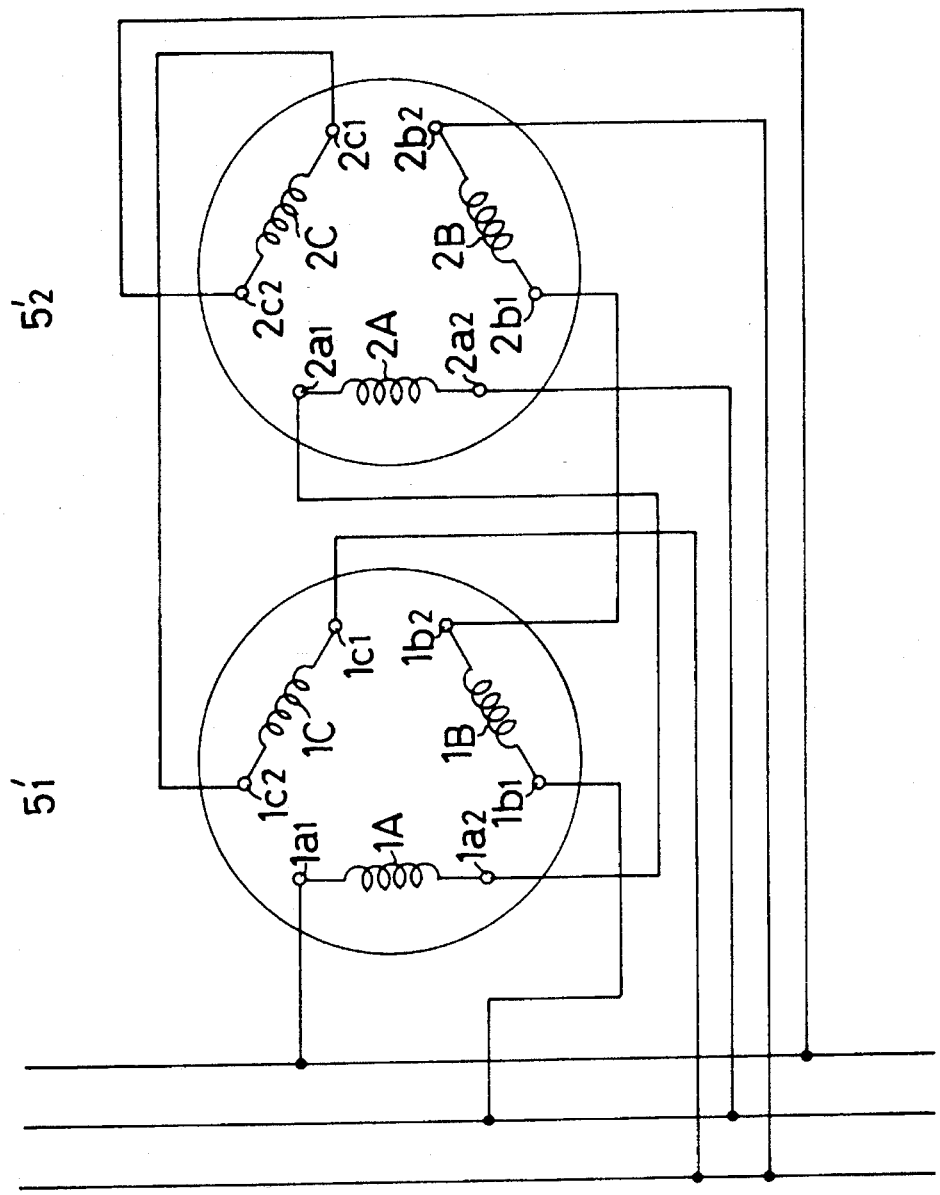

The above embodiment of the inventive conveyer device has exemplified those motors based on star-connection built in respective motor-incorporated rollers. It should be understood however that the scope of the invention is also applicable to those motors based on delta-connection. FIG. 7 exemplifies circuit diagrams as a result of practical application of the invention to delta-connection motors.

In addition, the art of the invention is also applicable to such a conveyer device incorporating single-phase motors.

Needless to say that the art of the invention is applicable not only to the above-referred roller conveyer device but also to a belt conveyer device as well. Likewise, connection structure of the motor-incorporated rollers is applicable not only to any conveyer device but also to all kinds of devices using motor-incorporated rollers as well.

What is claimed is:

1. A conveyer device comprising;
a plurality of motor-incorporated rollers each internally being provided with a motor, wherein at least two of said motor-incorporated rollers among said plural motor-incorporated rollers respectively have motors connected in series to each other.

2. The conveyer device according to claim 1, wherein interphase impedance of said serially connected motors built in said rollers is more than 400 Ω against supply power.

3. The conveyer device according to claim 1, wherein interphase impedance of said serially connected motors built in said rollers is more than 700 Ω against supply power.

4. The conveyer device according to claim 1, wherein rated voltage of said serially connected motors is one half the supply voltage.

5. The conveyer device according to claim 1, wherein rated voltage of said serially connected motors corresponds to the resultant value from division of supply voltage by the number of motors connected in series to each other.

6. A connection structure of a plurality of motor-incorporated rollers each internally being provided with a motor, wherein motors of at least two of said motor-incorporated rollers are connected to a power-supply source in series.

7. The connection structure of motor-incorporated rollers according to claim 6, wherein interphase impedance of said motors connected in series to each other in said rollers is more than 400 Ω against supply power.

8. The connection structure of motor-incorporated rollers according to claim 6, wherein interphase impedance of said motors connected in series to each other in said rollers is more than 700 Ω against supply power.

9. The connection structure of motor-incorporated rollers according to claim 6, wherein rated voltage of said motors connected in series to each other is one-half the supply voltage.

10. The connection structure of motor-incorporated rollers according to claim 6, wherein rated voltage of said motors connected in series to each other corresponds to the resultant value from division of supply voltage by the number of said motors connected in series to each other.

* * * * *